US 7,170,983 B2

(12) United States Patent
Gruchala et al.

(10) Patent No.: US 7,170,983 B2
(45) Date of Patent: Jan. 30, 2007

(54) METHOD AND SYSTEM FOR PROVIDING A WORK-AT-HOME TELECOMMUNICATION SERVICE

(75) Inventors: Carol S. Gruchala, Naperville, IL (US); John P. Morrison, Jr., Lake Fugich, IL (US)

(73) Assignee: Ameritech Services, Inc., Hoffman Estates, IL (US)

( * ) Notice: Subject to any disclaimer, the term of this patent is extended or adjusted under 35 U.S.C. 154(b) by 0 days.

(21) Appl. No.: 11/327,179

(22) Filed: Jan. 6, 2006

(65) Prior Publication Data

US 2006/0159254 A1     Jul. 20, 2006

Related U.S. Application Data

(63) Continuation of application No. 09/844,716, filed on Apr. 25, 2001, now Pat. No. 7,020,255, which is a continuation of application No. 08/723,853, filed on Sep. 30, 1996, now Pat. No. 6,252,953.

(51) Int. Cl.
*H04M 1/56* (2006.01)
*H04M 3/00* (2006.01)

(52) U.S. Cl. ............... 379/142.02; 379/142.09; 379/266.09

(58) Field of Classification Search ........... 379/112.09, 379/127.01, 127.03, 127.06, 142.02, 142.09, 379/221.08, 221.15, 266.09
See application file for complete search history.

(56) References Cited

U.S. PATENT DOCUMENTS 4,899,373 A    2/1990    Lee et al.

| 5,008,929 A | 4/1991 | Olsen et al. |
|---|---|---|
| 5,247,571 A | 9/1993 | Kay et al. |
| 5,353,331 A | 10/1994 | Emery et al. |
| 5,422,941 A | 6/1995 | Hasenauer et al. |

(Continued)

FOREIGN PATENT DOCUMENTS

WO     WO 98/06215     2/1998

OTHER PUBLICATIONS

Bellcore, Calling No. Delivery, TR-TSY-000031, Issue 2, Jun. 1988, pp. 1-3.

*Primary Examiner*—Bing Q. Bui
(74) *Attorney, Agent, or Firm*—Brinks Hofer Gilson & Lione (57) ABSTRACT

A work-at-home telecommunication service is provided in response to receiving, from a calling party, a service-specific vertical feature code and a dialed number to initiate a call. The call is suspended and a query is sent to a service control point after receiving the vertical feature code and the dialed number. The query includes the dialed number and a calling party identification number. A response to the query is formed using the service control point by translating the dialed number to a called party identification number, and by modifying the calling party identification number to an identification number of a group associated with the calling party. The response includes the called party identification number, the calling party identification number, and a carrier identification code which identifies a telecommunication carrier for the group associated with the calling party. The call is routed to the called party using the telecommunication carrier identified by the carrier identification code. A distinctive ring can be provided at the called party to indicate that the call is associated with the work-at-home telecommunication service.

20 Claims, 4 Drawing Sheets

U.S. PATENT DOCUMENTS

| | | |
|---|---|---|
| 5,452,350 A | 9/1995 | Reynolds et al. |
| 5,459,780 A | 10/1995 | Sand |
| 5,475,744 A | 12/1995 | Ikeda |
| 5,479,494 A | 12/1995 | Clitherow |
| 5,548,636 A | 8/1996 | Bannister et al. |
| 5,550,904 A | 8/1996 | Andruska et al. |
| 5,583,926 A | 12/1996 | Venier et al. |
| 5,590,184 A | 12/1996 | London |
| 5,680,446 A | 10/1997 | Fleischer, III et al. |
| 5,689,799 A | 11/1997 | Dougherty et al. |
| 5,729,598 A | 3/1998 | Kay |
| 5,761,290 A | 6/1998 | Farris et al. |
| 5,832,072 A | 11/1998 | Rozenblit |
| 5,889,845 A | 3/1999 | Staples et al. |
| 5,901,209 A | 5/1999 | Tannenbaum et al. |
| 5,974,133 A | 10/1999 | Fleischer, III et al. |
| 6,130,935 A | 10/2000 | Shaffer et al. |

Fig. 3B

METHOD AND SYSTEM FOR PROVIDING A WORK-AT-HOME TELECOMMUNICATION SERVICE

CROSS-REFERENCE TO RELATED APPLICATIONS

This application is a continuation of U.S. patent application Ser. No. 09/844,716, filed Apr. 25, 2001 now U.S. Pat. No. 7,020,255, which is a continuation of U.S. patent application Ser. No. 08/723,853, filed Sep. 30, 1996 (now U.S. Pat. No. 6,252,953), each of which is hereby incorporated by reference.

TECHNICAL FIELD

The present invention relates to telecommunication services provided using a public telephone system.

BACKGROUND ART

An increasing number of corporate employees are working, either part-time or full-time, at home to perform tasks associated with their jobs. This practice, known as telecommuting, is increasing in popularity as a result of a number of economical, political, and environmental factors.

A corporation can reduce office space requirements, and hence save money, by sharing desk space among a number of telecommuting employees. If needed, a desk at the office can be reserved for a limited duration by a telecommuting employee. During this limited duration, which may be on the order of hours or days, the telecommuting employee can perform certain tasks which are most amenable with he/she being at the office.

Telecommuting can also help corporations respond to Clean Air Act provisions which limit a number of employee-commuting cars on the road. In certain high-traffic areas, companies can be fined if a certain number of employees do not carpool, use public transportation, or work at home.

To serve the increasing number of telecommuters and their corporations, the need exists for improved telecommunication services to allow telecommuters to communicate with the office and with other telecommuters.

U.S. Pat. No. 5,247,571, issued to Kay et al. and assigned to Bell Atlantic Network Services, Inc., discloses an area-wide centrex service for a telephone communication network. As part of the area-wide centrex service, a work-at-home feature is provided.

In the work-at-home feature, a special service key actuation at an originating station triggers AIN recognition. A service switching point (SSP) central office then suspends the call and queries an integrated service control point (ISCP) to determine which business line the originating line corresponds to. Based on the identified business line, the ISCP retrieves processing data for completing the call or providing other area-wide centrex services as if the service request originated from the business group line.

SUMMARY OF THE INVENTION

It is an object of the present invention to provide a telecommunication service in which members of a group can selectively place group-related, direct-dialed calls from home, where the group-related calls are carried on a telecommunication carrier associated with the group rather than the members.

A further object of the present invention is to provide the above-described telecommunication service which is not limited to a centrex or area-wide centrex service.

A still further object of the present invention is to provide the above-described telecommunication service in which an indication of a group-related call is provided to a call-receiving member of a group.

Another object of the present invention is to provide a telecommunication service in which members of a group can selectively place group-related, direct-dialed calls from home, where per-line and per-call privacy indicators are honored in the group-related calls.

Yet another object is to provide a virtual network service which can be utilized without requiring a regular or fixed business location.

In carrying out the above objects, the present invention provides a method of providing a work-at-home telecommunication service. The method includes a step of receiving, from a calling party, a service-specific vertical feature code and a dialed number to initiate a call. After receiving the vertical feature code and the dialed number, a step of suspending the call and sending a query to a service control point is performed. The query includes the dialed number and a calling party identification number.

A step of forming a response to the query is performed by the service control point. The response is formed by translating the dialed number to a called party identification number and by modifying the calling party identification number to an identification number of a group associated with the calling party. The response includes the called party identification number, the calling party identification number, and a carrier identification code which identifies a telecommunication carrier for the group associated with the calling party.

A step of routing the call to the called party is performed using the telecommunication carrier identified by the carrier identification code. A step of providing a distinctive ring at the called party is performed to indicate that the call is associated with the work-at-home telecommunication service.

Further in carrying out the above objects, the present invention provides a system for providing a work-at-home telecommunication service. The system includes a service control point and a service switching point which performed the steps of the above-described method.

These and other features, aspects, and embodiments of the present invention will become better understood with regard to the following description, appended claims, and accompanying drawings.

BRIEF DESCRIPTION OF THE DRAWINGS

FIGS. 3(A–B) illustrate logic flow in a service control point to provide a work-at-home telecommunication service in accordance with the present invention.

BEST MODE FOR CARRYING OUT THE INVENTION

Figure 1:
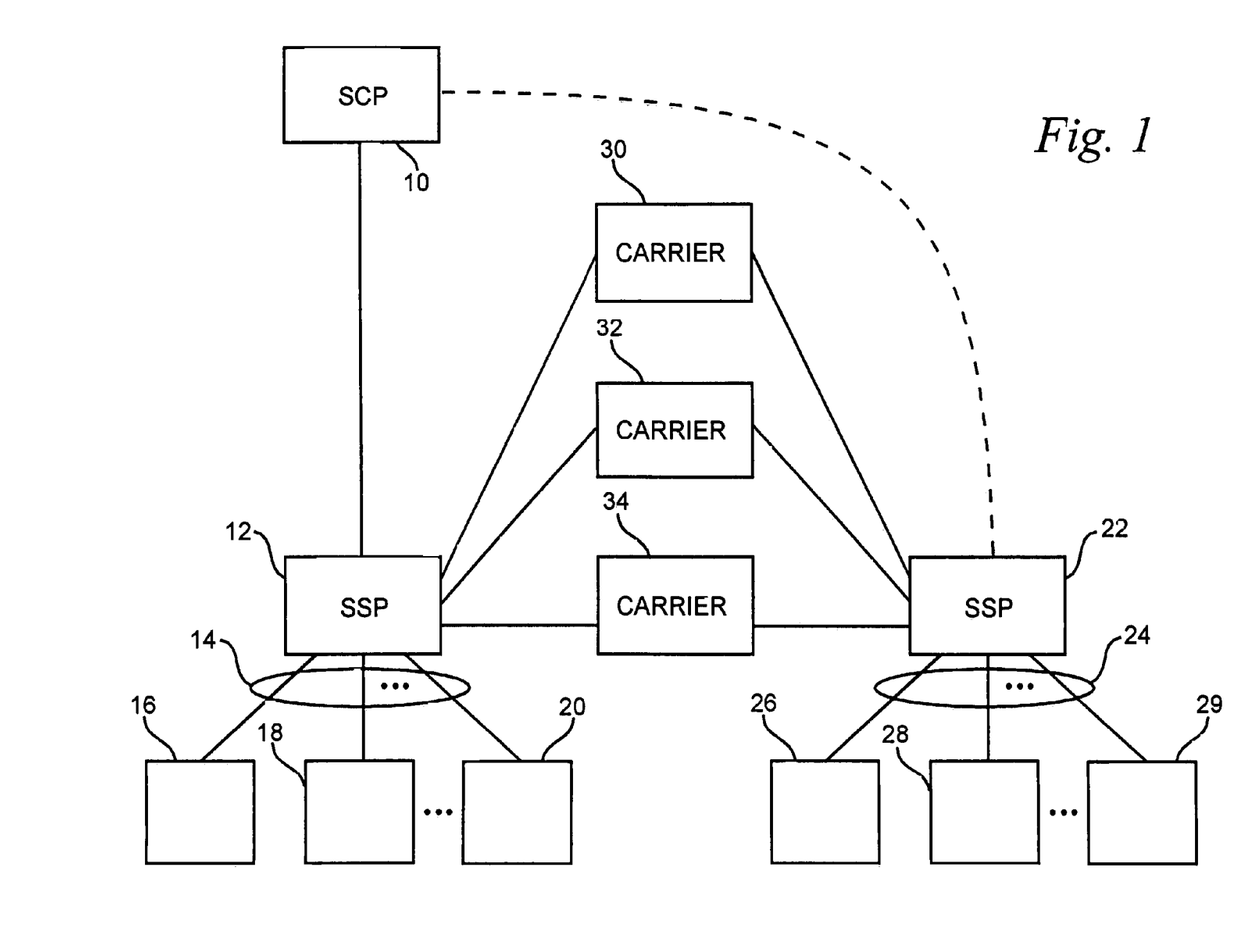
FIG. 1 is a block diagram of a system for providing a work-at-home telecommunication service in accordance with the present invention.

FIG. 1 is a block diagram of a system for providing a work-at-home telecommunication service in accordance with the present invention. The system utilizes an Advanced Intelligent Network (AIN) platform so that operating control over call processing and billing of the work-at-home service is centralized at a service control point (SCP) 10.

A service switching point (SSP) 12 serves a plurality of telephone lines 14, including a telephone line 16, a telephone line 18, and a telephone line 20. Another service switching point (SSP) 22 serves a plurality of telephone lines 24, including a telephone line 26, a telephone line 28, and a telephone line 29. The SSPs 12 and 22 can be included within respective central offices or end offices of a public telephone system.

In general, the SSPs 12 and 22 are AIN switching systems thatx recognize triggers indicative of AIN calls, and send queries to the SCP 10 in response thereto. The SCP 10 utilizes a database containing service-specific logic and data to form a response to each query. The response instructs either the SSP 12 or the SSP 22 on how to proceed with the AIN call.

Telephone calls are communicated between the SSPs 12 and 22 using any of the plurality of telecommunication carriers. The plurality of telecommunication carriers can include interexchange carriers, local exchange carriers, or any combination thereof. For the purpose of illustration, the plurality of telecommunication carriers includes a first telecommunication carrier 30, a second telecommunication carrier 32, and a third telecommunication carrier 34. The specific telecommunication carrier utilized for communicating a call is dependent upon a carrier identification code associated with the call, where each of the telecommunication carriers has a unique carrier identification code associated therewith.

For the purpose of illustration, the telephone lines 16, 18, 20, 26, 28, and 29 are members of a group which subscribes to the telecommunication service. The telephone lines 16, 18, 20, 26, 28, and 29 can be the home telephone lines of fellow employees of a business, for example, which subscribes to the work-at-home telecommunication service. Associated with the group are an identification number used for billing the group's telecommunication calls and a carrier identification code to identify a teleconununication carrier to carry the group's telecommunication calls.

A first member of the group initiates a call by preceding the call with a service-specific code. In one embodiment of the present invention, the service-specific code is "*96". After dialing the service specific code, such as "*96", the first member dials a phone number for either a second member of the group or for another individual outside of the group. The phone number for the second member can be in the form of a private virtual network number for the second member. If the first member desires that the call be anonymous, a privacy access code (such as "*67") is dialed prior to dialing the phone number.

Embodiments of the present invention are subsequently described for cases in which the first member dials a private virtual network number. It is noted, however, that any dialed number can be substituted for the private virtual network number to allow the first member to dial an individual outside of the group.

The SSP receives the service-specific code and the private virtual network number from the first member, and identifies the call as an AIN network call. The SSP suspends the call after receiving both the service-specific code and the private virtual network number, and sends a query to the SCP. The query includes the private virtual network number and a calling party identification number which identifies the first member. In one embodiment, the calling party identification number includes the ANI of the first member, i.e., the calling party.

The SCP forms a response to the query by translating the private virtual network number. In one embodiment, the private virtual network number is a seven-digit number conforming to a standard dialing plan. For example, the seven-digit number can conform to the NXX-XXXX portion of the North American Numbering Plan (NANP) format. Here, the private virtual network number can be translated by prefixing the seven-digit number with a predetermined string of digits, for example, the digits "1-700".

It is noted that embodiments of the present invention are not limited to use of a seven-digit dialed number. For example, in other embodiments, the dialed number can include a ten-digit number.

To allow for private virtual network numbers having a variable number of digits, a "#" can be dialed after the private virtual network number to indicate the end of dialing. Otherwise, the first member can wait for a predetermined time out condition to signal an end-of-dialing. Alternatively, an end-of-dialing condition is detected if the seven-digit NXX-XXXX has a valid number in the translation using the SSP.

In forming the response to the query, the SCP further acts to modify the calling party identification number to the identification number of the group. A calling party identification number in the form of an ANI is modified to a unique ANI associated with the telecommunication service user's work bill.

The response formed by the SCP includes the translated private virtual network number, the modified calling party identification number, and the carrier identification code which identifies the telecommunication carrier for the group. Based on whether the privacy services access code was dialed, the response can include a calling party identification presentation parameter set by the SCP. The SCP communicates the response back to the SSP.

The SSP receives the response from the SCP, and routes the call to the second member using the telecommunication carrier for the group. A distinctive ring is provided to the second member to indicate that the call is a virtual network call associated with the work-at-home telecommunication service. The SSP creates a billing record of the call wherein the call is billed to the group rather than the individual member. Here, all of the charges associated with the calls are recorded with the modified ANI and the carrier identification code.

In summary, the work-at-home telecommunication service includes both an originating component and a terminating component. The originating component provides individuals working at home an ability to place a direct dialed call from their home which is billed to "the office". Hence, the originating component provides both accounting services and network functionality. The terminating component provides a distinctive ringing pattern for work calls terminating to the virtual network user. The virtual network service ANI can be utilized to support this functionality.

In contrast, calls which do not include the service-specific code follow normal billing and routing processes. In other words, if a member makes a call without dialing the service-specific code, the call is billed to the member rather than the group, and the call is routed using a telecommunication carrier designated by the member rather than the group.

To provide the telecommunication service, the end offices can utilize SSPs compliant with AIN Release 0.1 or later. Here, the SCP is also AIN-compliant in accordance with Release 0.1 or later. Preferably, each end office offering the telecommunication service is equipped with a public office dialing plan (PODP) feature code trigger activated to detect the service-specific code. Here, the service-specific code is a vertical service code. End user telephone lines are also activated to support the service-specific code or vertical service code.

For end offices equipped with switches which do not support the PODP feature code trigger, a Customized Dialing Plan (CDP) trigger can be utilized. Here, the end users are designated as part of a Centrex group or an RES group which use an access code, rather than a vertical feature code, for the service-specific code. In some cases, it may be preferred to utilize a CDP trigger even if PODP feature code triggers are supported.

Figure 2:
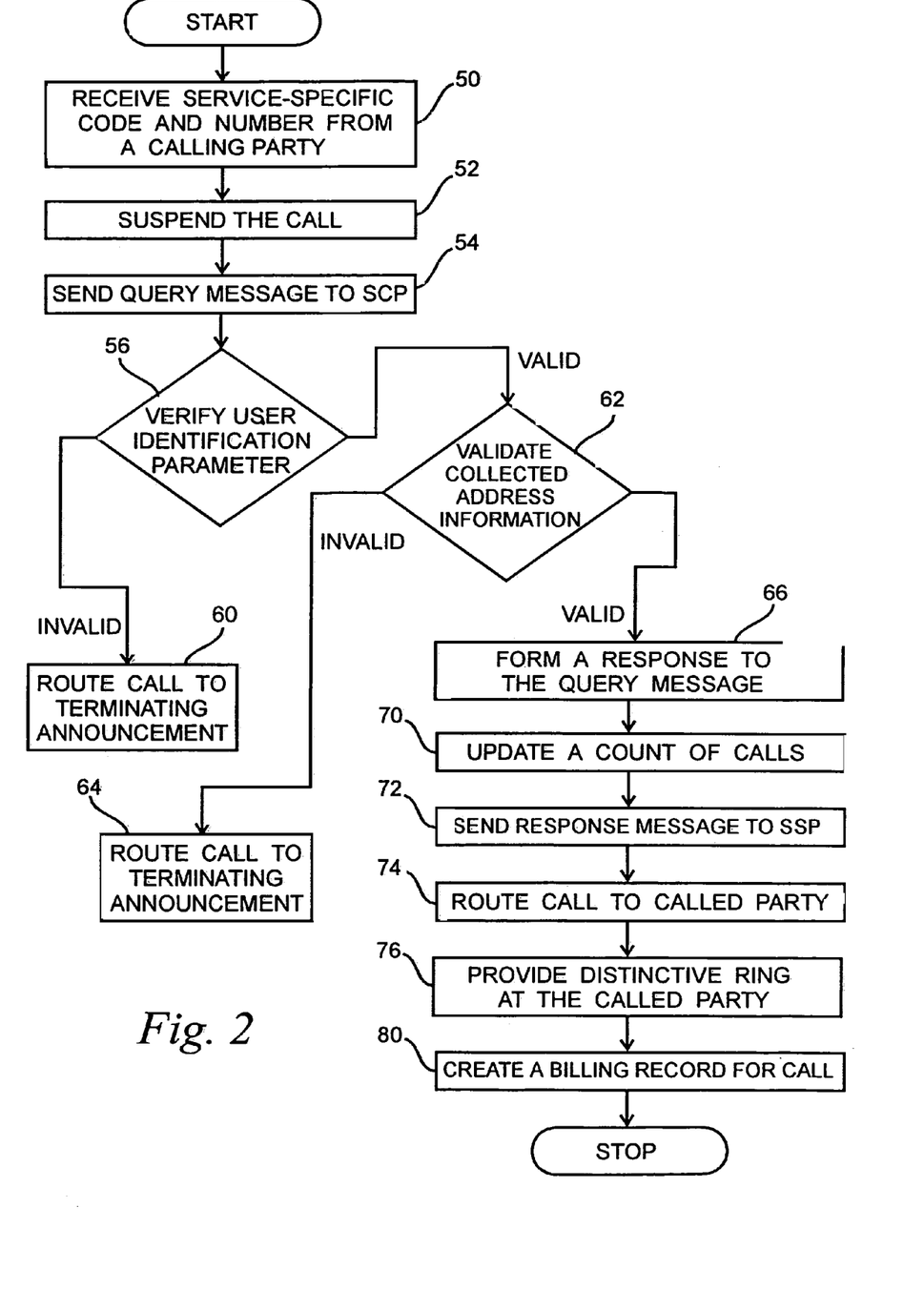
FIG. 2 shows a flow diagram of steps performed to provide a work-at-home telecommunication service in accordance with the present invention.

FIG. 2 shows a flow diagram of steps performed to provide an originating component of the telecommunication service. The method is performed using the components of the system described in FIG. 1.

As indicated by block 50, a step of receiving a service-specific code and a private virtual network number from a calling party initiating a call is performed. The service-specific code and the private virtual network number are received by the SSP at the end office via a public telephone line of the calling party.

After receiving the service-specific code and the private virtual network number, a step of suspending the call is performed as indicated by block 52. A query message is then sent to an SOP as indicated by the step in block 54. In an embodiment utilizing AIN 0.1 compliant components, the query message is an Info_Analyzed query message having the following parameters: a user identification parameter (UserID), a local access transport area parameter (LATA), a calling party identification parameter (CallingPartyID), a charge number parameter (ChargeNumber), collected address information (CollectedAddress Info) and/or collected digits information (CollectedDigits), a service-specific code parameter, and a trigger criteria type (TriggerCriteriaType). The service-specific code parameter is either a vertical service code parameter (utilizing the PODP feature code trigger) or an access code parameter (utilizing the CDP trigger).

A step of verifying that the user identification parameter is a valid entry for a particular business customer is performed as indicated by block 56. The step of verifying, or screening, can be performed either by the SCP or by a telecommunication carrier acting as a telecommunication service provider. If the user identification parameter is not a valid entry, then a step of routing the call to an appropriate terminating announcement is performed, as indicated by block 60. The announcement indicates to the user that the call cannot be completed as dialed. For example, the announcement can be: "We're sorry, we cannot complete your call as dialed. Please hang up, check the number and try again."

As indicated by block 62, a step of validating the digits from collected digits or collected address information is performed. For embodiments which utilize seven-digit private virtual network numbers, this step includes validating that the collected digits or collected address information is a seven-digit number. If the collected digits or collected address information is invalid, then a step of routing the call to a terminating announcement is performed, as indicated by block 64.

If the user identification parameter, the trigger criteria, the service-specific code, and the collected digits or collected address information are valid, then a step of forming a response to the query message is performed as indicated by block 66. Using an AIN platform, the response is formed using the SCP. In the AIN 0.1 embodiment, the response message includes an Analyze_Route message with an AMA Slip identification parameter (AMASLPID) to establish a billing record in the SSP. The Analyze_Route message also contains the calling party identification parameter (CallingPartyID), a called party identification parameter; a charge number parameter, a primary carrier parameter, an AMALineNumber parameter, and an AMA Alternative Billing Number parameter.

The step of forming the response includes a step of populating billing parameters, such as an AMALineNumber parameter and an AMA Alternate Billing Number parameter of the business customer, in the response message. The step of forming the response also includes modifying the calling party identification parameter and the charge number parameter to the billing number associated with the calling party's business group. It is noted that this step is performed subsequent to capturing the originating calling number to populate the AMALineNumber.

In forming the response, the SCP honors a privacy indicator for the calling party. Hence, if the user dials a privacy access code (such as "*67"), the call is anonymous. Further, if a user has per-line blocking, the blocking is honored by the SCP. Consequently, the service restricts the passing of the calling party identification parameter for both per-call and per-line privacy indicators.

The step of forming the response further includes a step of translating the called number. The called number can be translated by including a "700" prefix thereto; In general, the called number can be translated to any NANP number. The translation is performed in accordance with a translation table provided by every customer/telecommunication carrier/telecommunication service provider. The translation table indicates the translated number for each dialed number or range of dialed numbers for the group.

Further, the response includes a carrier identification code identifying the telecommunication carrier selected by the business customer. As indicated by block 70, a step of updating a count of calls routed to a particular carrier is performed. The count can be updated for each carrier identification code and/or for each telecommunication service provider if each provider has multiple carrier identification codes. For telecommunication carriers having multiple carrier identification codes, a plurality of counts can be maintained. If desired, other measurements can also be updated in this step.

The response message is sent to the SSP in a step indicated by block 72. The SSP performs a step of routing the call to the called party, as indicated by block 74, using the telecommunication carrier identified by the carrier identification code. A step of providing a distinctive ring at the called party to indicate that the call is associated with the work-at-home telecommunication service is performed as indicated by block 76. This step provides the terminating component of the telecommunication service.

A step of creating a billing record, using the SSP, based on the AMASLPID sent from the SCP is performed as indicated by block 80. For example, the work-at-home telecommunication service can have a unique AMASLPID of 008880000 assigned thereto. The billing record includes the Alternative Billing Number, the AMALineNumber, and the CalledPartyID sent from the SCP in the response message.

Figure 3A:
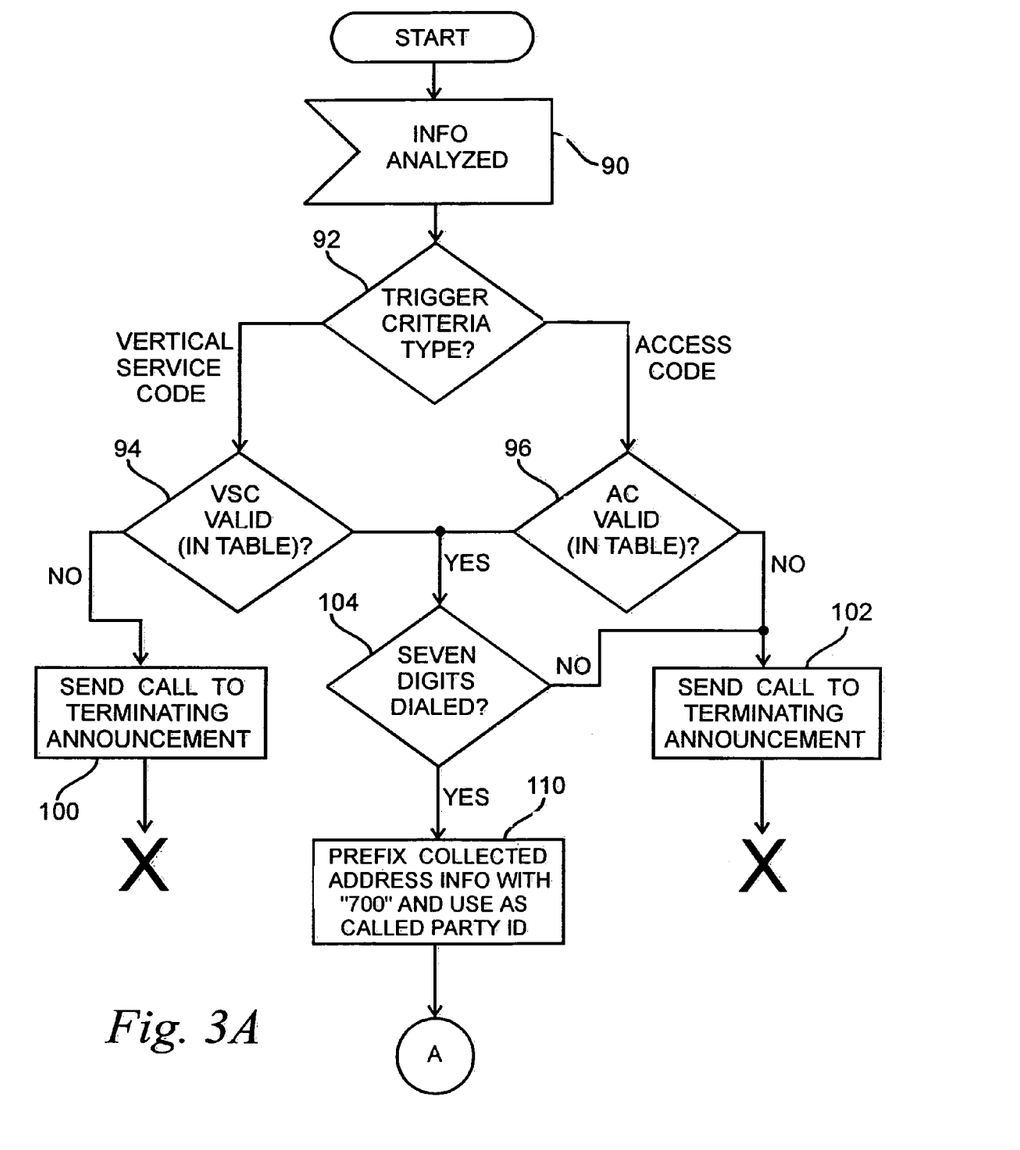
Figure 3B:
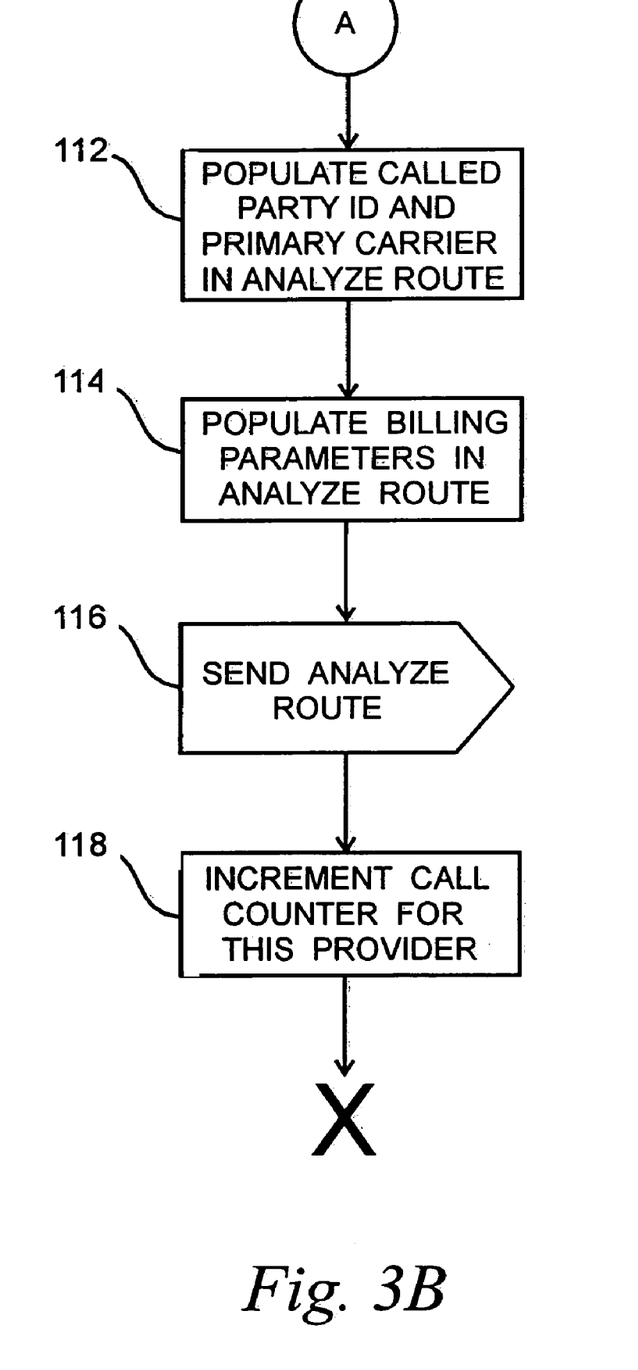

FIGS. 3(A–B) show a more detailed flow chart of SCP logic flow to provide the telecommunication service. As indicated by block 90, the SCP receives a query from an SSP. As described earlier, the query can be in the form of an Info_Analyzed query message.

The SSP creates the Info_Analyzed query message to send the SCP after encountering either a Vertical Service Code or Access Code trigger. The Vertical Service Code and Access Code triggers on an SSP are provisioned to collect a variable number of digits. This means that the SSP sends the dialed digits in the CollectedDigits parameter of the Info_Analyzed query. The service logic is set up to be able to also recognize digits from the CollectedAddressInfo parameter if the SSP were to be set up to collect a normal number of digits.

The Info_Analyzed parameters shown in Table I are expected by the telecommunication service. If the parameters are not populated as expected, the call will be terminated to an announcement.

TABLE I

| Parameter | Description | |
|---|---|---|
| TriggerCriteriaType | verticalServiceCode or customizedAccess | |
| | Expected Range: | 1 = verticalServiceCode |
| | | 2 = customizedAccess |
| CallingPartyID | DN of the calling party | |
| | Expected Range: AIN Digits format | |
| | odd/even indicator | 0 = even |
| | nature of number | 3 = national |
| | numbering plan | 1 = ISDN |
| | screening indicator | 3 = network |
| | presentation | 0 = allowed |
| | restricted ind | 1 = restricted |
| | digits | 10 digits |
| AccessCode | AccessCode that caused the trigger (with CustomizedAccess trigger only). | |
| | Expected Range: AIN Digits format | |
| | odd/even indicator | 1 = odd |
| | nature of number | 0 = not applicable |
| | numbering plan | 0 = not applicable |
| | digits | *96 |
| VerticalServiceCode | Vertical Service Code that caused the trigger (with Vertical Service Code trigger only). | |
| | Expected Range: AIN Digits format | |
| | odd/even indicator | 1 = odd |
| | nature of number | 0 = not applicable |
| | numbering plan | 0 = not applicable |
| | digits | *96 |
| CollectedDigits | Digits collected from a user (assume 'variable' number of digits collected at SSP). | |
| | Expected Range: AIN Digits format | |
| | odd/even indicator | 1 = odd |
| | nature of number | 0 = not applicable |
| | numbering plan | 0 = not applicable |
| | digits | 7 or 10 digits |
| CollectedAddressInfo | Digits collected from a user (7 or 10 digits when 'normal' number of digits collected at SSP). | |
| | Expected Range: AIN Digits format | |
| | odd/even indicator | 1 = odd |
| | nature of number | 0 = not applicable |
| | numbering plan | 0 = not applicable |
| | digits | 7 or 10 digits |
| UserID | DN of the originating facility | |
| | Expected Range: | |
| | DN | 10 digits |

As indicated by block 92, the SCP determines the type of service-specific code and trigger based on the query. Here, the SCP examines the state of the TriggerCriteriaType parameter in the query message. If the service-specific message is a vertical service code, then flow is directed to block 94. If the service-specific message is a customized access code, then flow is directed to block 96.

Block 94 is indicative of a step examining the validity of the vertical service code. If the vertical service code is invalid, i.e., is not in a vertical service code table, the a step of sending the call to a terminating announcement is performed as indicated by block 100.

Block 96 is indicative of a step of examining the validity of the customized access code. If the customized access code is invalid, i.e., is not in an access code table, a step of sending the call to a terminating announcement is performed as indicated by block 102.

If either the vertical service code or the customized access code are valid, flow is directed to block 104 wherein a step of determining if a predetermined number of digits were dialed. Typically, the predetermined number is seven. Alternatively, the predetermined number can be ten. If a non-standard number of digits were dialed, then the step of sending the call to a terminating announcement is performed as indicated by block 102.

The telecommunication service logic creates and sends an Analyze_Route for valid queries as determined by the step in block 104. The following Analyze_Route parameters shown in Table II will be populated by the telecommunication service logic.

TABLE II

| Parameter | Description | |
|---|---|---|
| ChargeNumber | ANI of the calling party (replaced by the Business/Billing number for the service). | |
| | Expected Range: AIN Digits format | |
| | odd/even indicator | 0 = even |
| | nature of number | 3 = national |
| | numbering plan | 1 = ISDN |
| | digits | 10 = digits |
| CallingPartyID | DN of the calling party (replaced by the Business/Billing number for the service). | |
| | Expected Range: AIN Digits format | |
| | odd/even indicator | 0 = even |
| | nature of number | 3 = national |
| | numbering plan | 1 = ISDN |
| | screening indicator | 3 = network |
| | presentation | 0 = allowed |
| | restricted ind | 1 = restricted |
| | digits | 10 digits |
| | The presentation restricted ind will be populated with the CallingPartyID presentation restricted ind parameter from the query | |
| | digits | 10 digits |
| CalledPartyID | Contains the DN associated with the called party (NPA portion will contain value related to Carrier/Subscription). | |
| | Expected Range: AIN Digits format | |
| | odd/even indicator | 0 = even |
| | nature of number | 3 = national |
| | numbering plan | 1 = ISDN |
| | digits | 10 digits |
| PrimaryCarrier | Contains carrier selection and carrier ID. | |
| | Expected Range: Carrier format | |
| | selection | 1 = presubscribed/not input |
| | id | number of digits 4 |
| | | carrier digits 0222 |
| AMA AlternateBillingNumber | This parameter identifies the billed party (Business/Billing number for the service) | |
| | Expected Range: AIN Digits format | |
| | odd/even indicator | 0 = even |
| | nature of number | 2 = ANI not avail. |
| | numbering plan | 0 = unknown |
| | digits | 10 digits |

TABLE II-continued

| Parameter | Description | | |
|---|---|---|---|
| AMALineNumber | This parameter is the Automatic Number Identification (ANI) | | |
| | Expected Range: | | |
| | odd/even indicator | 1 = odd | |
| | nature of number | N/A | |
| | numbering plan | N/A | |
| | screening indicator | 0 = user provided/not screened | |
| | presentation restricted ind | 0 = allowed | |
| | digits (13 total): | | |
| | Line Number Type: | 005 | |
| | Line Number | 10 digits | |
| | (Line Number = CallingPartyID from query) | | |
| AMAslpID | This parameter uniquely identifies the services. | | |
| | Default Value: | 008880000 | |

As indicated by block 110, the CollectedDigits or CollectedAddressInfo parameter is prefixed with "700" and used as the CalledPartyID parameter. It is noted, however, that alternative translations may be performed in this step.

As indicated by block 112, a step of populating the CalledPartyID and the PrimaryCarrier parameters in the response message is performed. The billing parameters are populated in a step indicated by block 114. The billing parameters include CallingPartyID, ChargeNumber, AMAslpID, and AMAAlternate BillingNumber. Preferably, the billing parameters are populated with a business/billing number for a subscriber. The AMALineNumber parameter is populated with "005" plus the CallingPartyID from the query. A step of sending the response message back to the SSP is performed as indicated by block 116.

A call counter for the provider is incremented as indicated by block 118. In a preferred embodiment, a counter table maintains peg count data regarding the PIC (PrimaryCarrier) of telecommunication calls. The peg count data is kept for subscribers to the telecommunication service and are pegged on a per-call basis. The parameters of the counter table are illustrated in Table III.

TABLE III

| Parameter | Description |
|---|---|
| SubGrp: | This field is a key for the measurement that is to be pegged. The PrimaryCarrier value is used as the SubGrp for pegging the OrigCounter and TermCounter. This field is a 3 character string. |
| OrigCounter: | This field indicates the number of calls made using a specific PIC (PrimaryCarrier). This value is incremented by one every time a call is made from the specific PIC. This field is of type counter. |
| TermCounter: | This field indicates the number of calls made using a specific PIC (PrimaryCarrier). This value is incremented by one every time a call is made from the specific PIC. This field is of type counter. |

Both the OrigCounter and the TermCounter parameters are pegged for the specific PIC. The counts are collected, stored in the SCP, and then polled by an SMS at regular time intervals. The intervals can be on the order of a half-hour.

Subscriber-specific recent change data is maintained in a dialing plan table, a vertical service code table, and an access code table. The dialing plan table contains call information to be used on a per-user basis. The parameters of the dialing plan table are shown in Table IV.

TABLE IV

| Parameter | Description |
|---|---|
| OrigSugGrp: | Originator's subscription group (from Subscription_Group field of the User-Table in SAM (Service Access Manager)). This is one of the keys for this table and represents a group within a subscription. The UserID or ChargeNumber parameters of the Info_Analyzed message is used by SAM to determine the Subscription_Group for the caller. This field is a 3 character string. |
| StartDPDig: | This field is used as an index into the Dialing Plan Table along with the OrigSubGrp. This is a 7 digit field to hold the NXX-XXXX portion of the CallingPartyID for each user. |
| EndDPDig: | This field contains 7 digits (NXX-XXXX) of the 10-digit Business/Billing number for this specific user. The NPA portion comes from the 3 digits removed from CallingPartyID value used to become the StartDPDIG index for the table lookup. |
| PrimaryCarrier: | This field indicates the primary carrier to use for calls. For example, this 4 character string can be "0222". |
| AltCarrier: | This field contains the NPA to prefix onto the (CollectedAddressInfo value of the Info)_Analyzed message (dialed digits) and create the CalledPartyID. This 4 character string can be "700" (left justified), for example. |

The NXX-XXXX portion of the CallingPartyID along with the OrigSubGrp are used to index the dialing plan table to retrieve the billing number. The billing number can be a seven-digit number stored in the EndDPDig field, or a ten-digit number if the NPA from CallingPartyID is used. The dialing plan table also holds the Carrier value stored in the PrimaryCarrier field to populate the PrimaryCarrier parameter.

The parameters for the vertical service code table and the access code table are given in Tables I and VI, respectively.

TABLE V

| Parameter | Description |
|---|---|
| OrigSubGrp: | This field is a 3 character string which can have a value of "1", for example. |
| VsCode: | The vertical service code to be used for the telecommunication service. This 10 character string can be "*96", for example. |

TABLE VI

| Parameter | Description |
|---|---|
| OrigSubGrp: | This field is a 3 character string which can have a value of "1", for example. |
| AccessCode: | The access code to be used for the telecommunication service. This 5 character string is expected to be "*96", for example. |

In summary, embodiments of the present invention allow an end user who is working at home to make calls to fellow employees who are part of a virtual network created by a telecommunication carrier. Billing characteristics associated with the call are altered to allow the call to be billed directly to the subscriber. An incoming virtual-network work-at-home call has a distinctive ringing pattern that allows incoming calls to be identified to the user as such a call.

Further, an end user can make calls to other persons outside of the virtual network, and have those calls billed to the subscriber. To provide a means of security, embodiments of the present invention can require that a personal identification number (PIN) be entered after dialing the service-specific vertical feature code. The system for providing the telecommunication service is operative to complete the call and bill the call to the subscriber if a correct PIN is received, and to inhibit the call and/or bill the call to the end user if an incorrect PIN is received.

It is noted that a service interface at the user's premises can be in the form of a telephone or a fax. A customer interface can be mechanized so that the customer can provision users and receive notification of service conflicts which exist on a line in real-time.

The above-described embodiments of the present invention have many advantages. By forming an SCP response which includes a carrier identification code for a group, embodiments of the present invention allow members of the group to selectively place group-related, direct-dialed calls from home, where the group-related calls are carried on a telecommunication carrier identified by the carrier identification code for the group rather than the members.

By utilizing vertical service feature codes to trigger the service, embodiments of the work-at-home service are not limited to being part of a centrex or area-wide centrex service. Further, members of a group can selectively place group-related, direct-dialed calls from home, where per-line and per-call privacy indicators are honored in the group-related calls.

By providing a distinctive ring for group-related calls, embodiments of the present invention alert call-receiving members of the group of group-related calls.

While the best mode for carrying out the invention has been described in detail, those familiar with the art to which this invention relates will recognize various alternative designs and embodiments for practicing the invention as defined by the following claims.

What is claimed is:

1. A system for providing an identification of a group associated with a calling party to a called party, the system comprising:
   one or more telecommunication components that, together, are operative to:
      receive a dialed number associated with a called party from a calling party, the calling party being associated with a calling party identification number;
      modify the calling party identification number to a calling party identification number of a group associated with the calling party; and
      in response to a privacy indicator, restrict a passing of the calling party identification number of the group associated with the calling party.

2. The system of claim 1, wherein the one or more telecommunication components comprises one or more components selected from a group consisting of a service control point and a signal switching point.

3. The system of claim 1, wherein the one or more telecommunication components is further operative to pass the calling party identification number of the group associated with the calling party if the privacy indicator is not present.

4. The system of claim 1, wherein the privacy indicator comprises a privacy access indicator.

5. The system of claim 1, wherein the privacy indicator comprises a per-line blocking indicator.

6. The system of claim 1, wherein the group comprises a business, and wherein the calling party comprises an employee of the business.

7. The system of claim 1, wherein the calling party identification number comprises the calling party's ANI, and wherein the calling party identification number of the group associated with the calling party comprises the group's ANI.

8. A system for providing an identification of a group associated with a calling party to a called party, the system comprising:
   one or more telecommunication components that, together, are operative to:
      receive a dialed number associated with a called party from a calling party, the calling party being associated with a calling party identification number;
      modify the calling party identification number to a calling party identification number of a group associated with the calling party; and
      pass the calling party identification number of the group associated with the calling party to the called party.

9. The system of claim 8, wherein the one or more telecommunication components comprises one or more components selected from a group consisting of a service control point and a signal switching point.

10. The system of claim 8, wherein the one or more telecommunication components is further operative to modify a billing identification number of the calling party to a billing identification number of the group associated with the calling party.

11. The system of claim 10, wherein the one or more telecommunication components is further operative to create a billing record based upon the modified billing identification number.

12. The system of claim 10, wherein the billing identification number comprises an ANI number.

13. The system of claim 8, wherein the group comprises a business, and wherein the calling party comprises an employee of the business.

14. The system of claim 8, wherein the calling party identification number comprises the calling party's ANI, and wherein the calling party identification number of the group associated with the calling party comprises the group's ANI.

15. A method for providing an identification of a group associated with a calling party to a called party, the method comprising:
   receiving a dialed number associated with a called party from a calling party, the calling party being associated with a calling party identification number;
   modifying the calling party identification number to a calling party identification number of a group associated with the calling party; and
   providing the calling party identification number of the group associated with the calling party to the called party.

16. The method of claim 15 further comprising modifying a billing identification number of the calling party to a billing identification number of the group associated with the calling party.

17. The method of claim 16 further comprising creating a billing record based upon the modified billing identification number.

18. The method of claim 16, wherein the billing identification number comprises an ANI number.

19. The method of claim 15, wherein the group comprises a business, and wherein the calling party comprises an employee of the business.

20. The method of claim 15, wherein the calling party identification number comprises the calling party's ANI, and wherein the calling party identification number of the group associated with the calling party comprises the group's ANI.

* * * * *